United States Patent
Kawahara

(10) Patent No.: US 6,263,757 B1
(45) Date of Patent: Jul. 24, 2001

(54) CABLE END STRUCTURE FOR PULL-CABLE

(75) Inventor: Satoru Kawahara, Nagoya (JP)

(73) Assignee: Chuohatsujo Kabushiki Kaisha (JP)

( * ) Notice: Subject to any disclaimer, the term of this patent is extended or adjusted under 35 U.S.C. 154(b) by 0 days.

(21) Appl. No.: 09/313,474

(22) Filed: May 17, 1999

(30) Foreign Application Priority Data

May 18, 1998 (JP) .................................................. 10-153858

(51) Int. Cl.$^7$ ....................................................... F16C 1/14

(52) U.S. Cl. ......................................... 74/502.6; 74/502.5

(58) Field of Search ............................... 74/502.4, 502.6, 74/513, 502.5, 500.5; 248/56

(56) References Cited

U.S. PATENT DOCUMENTS

| | | | | |
|---|---|---|---|---|
| 4,738,155 | * | 4/1988 | Stocker ................................ | 74/502.6 |
| 4,773,278 | * | 9/1988 | Hanaoka et al. .................... | 74/500.5 |
| 5,493,934 | * | 2/1996 | Kelley ................................... | 74/502.6 |
| 5,570,611 | * | 11/1996 | Pospisil et al. ..................... | 74/502.6 |
| 5,579,663 | * | 12/1996 | Likich et al. ........................ | 74/502.5 |

* cited by examiner

Primary Examiner—Mary Ann Green
(74) Attorney, Agent, or Firm—Lackenbach Siegel Marzullo Aronson & Greenspan

(57) ABSTRACT

A cable end structure in which the cable end device and an intermediate cushion are tightly engaged with each other by mating conical surfaces without an apprehension that they might be shifted relatively to each other. In this way, inflection of the cushion and interfacial contact pressure caused by such inflection can be minimized and the durability of the cushion can be effectively improved.

7 Claims, 1 Drawing Sheet

CABLE END STRUCTURE FOR PULL-CABLE

BACKGROUND OF THE INVENTION

1. Field of the Invention

This invention relates to a cable end structure for a pull-cable normally placed under a tractive or tensile force and particularly to such cable end structure for a rocking end such as a pedal side end of a car's accelerator cable.

2. Description of the Prior Art

Conventionally, on the pedal side end of car's accelerator cable, the cushion is disposed between the pedal and the cable and device in order to absorb a vibration of the engine. However, a rocking movement of the pedal causes the cable end device to be eccentrically pressed against the cushion.

Consequently, the accelerator cable exerts a bending load upon the cushion which is thereby inflected, on one hand, and the accelerator cable intensely rubs the cushion which is thereby abraded. These problems have made it difficult to improve a durability of the cable end structure.

SUMMARY OF THE INVENTION

This invention aims to solve these problems left behind by the prior art and to date remains unsolved.

The object set forth above is achieved, by forming one of the cable end device and the cushion with a convex portion and forming the other with a concave portion so that these convex portion and concave portion may be tightly engaged with each other and thereby the cable end device and the cushion may be maintained in a close contact with each other. Infection of the cushion as well as interfacial contact pressure due to such inflection can be minimized and the durability of the cushion can be effectively improved because there is no apprehension that said cable end device and said cushion might be shifted relatively to each other. The invention further proposes that said cable end device and said cushion are maintained in a close contact with each other by a tight engagement between a conical convex portion and a conical concave portion formed on end surfaces of said cable end device and said cushion, respectively. With such arrangement, even if the accelerator cable slacks and consequently the cable end device is disengaged from the cushion for some reason, the cable end device an be automatically brought in a concentric engagement with the cushion.

DESCRIPTION OF THE PREFERRED EMBODIMENT

Figure 1:
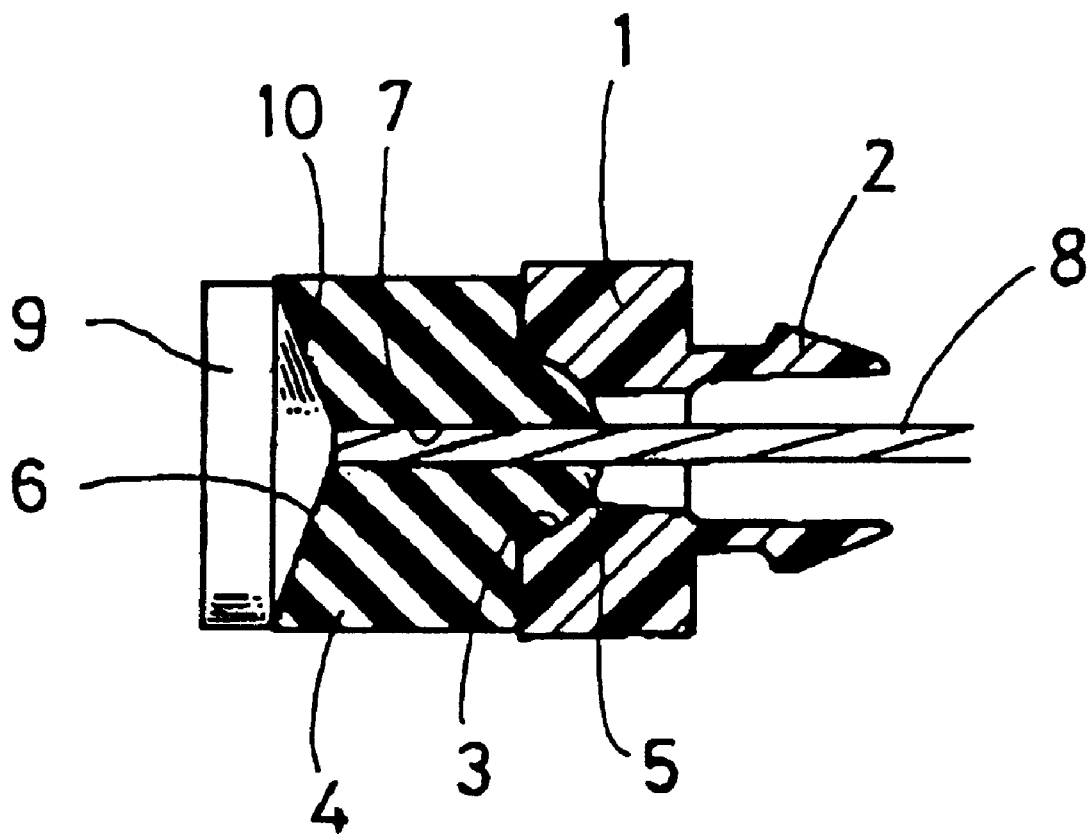
FIG. 1 is a sectional view showing one preferred embodiment of the invention.

Details of the invention will be more fully understood from the description given hereinafter when taken with reference to the accompanying drawing.

Referring to FIG. 1, reference numeral 1 designates a fixture made of synthetic resin having an elastic hook member 2 adapted to be snap-fitted on an opposite member (not shown) such as an accelerator pedal characterized by its rocking movement. The fixture 1 is formed on its rear end with a semi-spherical concave portion 3.

Reference numeral 4 designates a rubber cushion which is formed on its front end with a semi-spherical convex portion 5 adapted to be tightly engaged with said concave portion 3 and on its rear end with a conical concave portion 5. The rubber cushion 4 is further formed with an axial through-hole 7.

Reference numeral 8 designates a pull-cable such as an accelerator cable which is provided at its end with a metallic cable end device 9 integrally fixed thereto by a die casting process.

Inner end surface of the cable end device 9 is formed with a conical convex portion 10 adapted to be tightly engaged with the concave portion 6 of the cushion 4.

With such arrangement according to this preferred embodiment, even when a tractive force is obliquely exerted on the pull-cable 8, the concave portion 6 is maintained in tight engagement with the convex portion 10 and thereby the cable end device 9 is maintained in concentric alignment with said concave portion 6. Consequently, a bending of the cushion as well as an interfacial contact pressure due to such bending can be effectively alleviated and thereby durability of said cushion 4 can be improved.

It should be understood that this invention is applicable not only for the accelerator cable but also applicable for the other types of pull-cable and particularly suitable for a pull-cable of a relatively small diameter which is correspondingly liable to be affected by a high interfacial contact pressure when such pull-cable is intensely pressed against the cushion.

It is to be noted that the cable end device and the cushion have matching conical surfaces which surfaces are shallow or acutely angled. The respective acute angles of the matching conical surfaces are matching angles, preferably less than 45 degrees.

What is claimed is:

1. A pull cable end structure, through which a pull cable is inserted comprising:

a fixture, having an axial hole, a cable end device mounted on an end of said pull cable, and an intervening element in the form of a cushion with an axial hole, and being disposed between said cable end device and said fixture, for absorbing vibration, and said pull cable end structure enabling engagement of said cushion and said cable end device with each other when said pull cable is under tension;

wherein one end of said cable end device and the adjacent end of said cushion are formed with a respective conical portion, so that these conical portions are tightly engaged with each other in order to maintain said cushion and said cable end device in constant close contact with each other even if force is obliquely exerted on said pull cable;

so that said cable end device is coaxially engaged with said cushion as said pull cable is pulled, and is maintained in engagement with said cushion even if force is obliquely exerted on said pull cable.

2. A pull cable end structure, through which a pull cable is inserted, comprising:

a fixture, having an axial hole, a cable end device mounted on an end of said pull cable, and an intervening element in the form of a cushion with an axial hole, and being disposed between said cable end device and said fixture, for absorbing vibration, said pull cable end structure enabling engagement of said cable end device and said cushion with each other at their adjacently disposed ends when said pull cable is under tension; and wherein one end of said cable end device and the adjacent end of said cushion are formed with a respective conical portion so that these conical portions are tightly engaged with each other in order to maintain said cushion and said cable end device in constant close contact with each other even if force is obliquely exerted on said pull cable.

3. The pull cable end structure according to claim 2, wherein said cushion is made of rubber.

4. A pull cable end structure, through which a pull cable is inserted comprising:

a fixture, having an axial hole, a cable end device mounted on an end of said pull cable, and an intervening element in the form of a cushion with an axial hole, and being disposed between said cable end device and said fixture, for absorbing vibration, and said pull cable end structure enabling engagement of said cushion and said cable end device with each other when said pull cable is under tension;

wherein said cable end device and said cushion have juxtaposed mating conical surfaces for the automatic concentric engagement or seating therebetween, so that by maintaining close contact of said cushion and said cable end device, the durability of said cushion is improved and bending or distortion thereof is minimized when a non-axial tension force is applied to said pull cable;

so that said cable end device is coaxially engaged with said cushion as said pull cable is pulled and is maintained in engagement with said cushion even if force is obliquely exerted on said pull cable.

5. The pull cable end structure according to claim 4, wherein said mating conical surfaces are at acute angles.

6. The pull cable end structure according to claim 5, wherein said mating conical surfaces are at matching acute angles.

7. The pull cable end structure according to claim 6, wherein said matching acute angles are less than 45 degrees.

* * * * *